United States Patent [19]

Peters

[11] Patent Number: 5,384,978
[45] Date of Patent: Jan. 31, 1995

[54] CORNER CLAMP ASSEMBLY

[75] Inventor: Alan R. Peters, Stratford, Conn.

[73] Assignee: The Fletcher-Terry Company, Farmington, Conn.

[21] Appl. No.: 35,237

[22] Filed: Mar. 22, 1993

[51] Int. Cl.6 .................................................. F16B 7/04
[52] U.S. Cl. ........................................ 40/155; 403/362; 403/248; 403/405.1
[58] Field of Search ...................... 40/155, 156, 159.1; 403/362, 331, 248, 405.1

[56] References Cited

U.S. PATENT DOCUMENTS

| | | | |
|---|---|---|---|
| 2,217,656 | 10/1940 | Boehme | 403/362 X |
| 3,534,490 | 10/1970 | Herbert | 40/155 |
| 3,620,558 | 11/1971 | MacMillian | 403/362 X |
| 3,965,601 | 6/1976 | Nielsen | 40/155 |
| 4,122,617 | 10/1978 | Nielsen | 40/155 |
| 4,356,650 | 11/1982 | Antonczyk et al. | 40/160 |
| 4,377,915 | 3/1983 | Zossimos et al. | 40/155 |
| 4,403,434 | 9/1983 | Jenkins | 40/152 |
| 4,490,064 | 12/1984 | Ducharme | 403/362 X |
| 4,516,341 | 5/1985 | Jenkins | 40/152 |
| 4,694,598 | 9/1987 | Eisenloeffel | 40/155 |
| 4,718,184 | 1/1988 | Sherman | 40/155 |
| 4,859,109 | 8/1989 | Targetti | 403/362 X |
| 4,896,992 | 1/1990 | Muhlethaler | 403/362 X |
| 5,015,118 | 5/1991 | Sewell et al. | 403/362 X |

FOREIGN PATENT DOCUMENTS

| | | |
|---|---|---|
| 1168445 | 6/1984 | Canada . |
| 1178439 | 11/1984 | Canada . |
| 1571595 | 7/1980 | United Kingdom . |

Primary Examiner—Peter R. Brown
Assistant Examiner—Cassandra Davis
Attorney, Agent, or Firm—Ira S. Dorman

[57] ABSTRACT

A clamp assembly for use in constructing a picture frame consists of two superposed, separate plates. One plate has a threaded aperture for receipt of a jacking screw, and the other has a recess for engaging the tip of the screw, the axes of which are offset when the lateral edges of the plates are in mutual registry. Advancement of the screw separates and shifts the plates, thus exerting lateral as well as a transverse gripping forces upon the frame members.

11 Claims, 1 Drawing Sheet

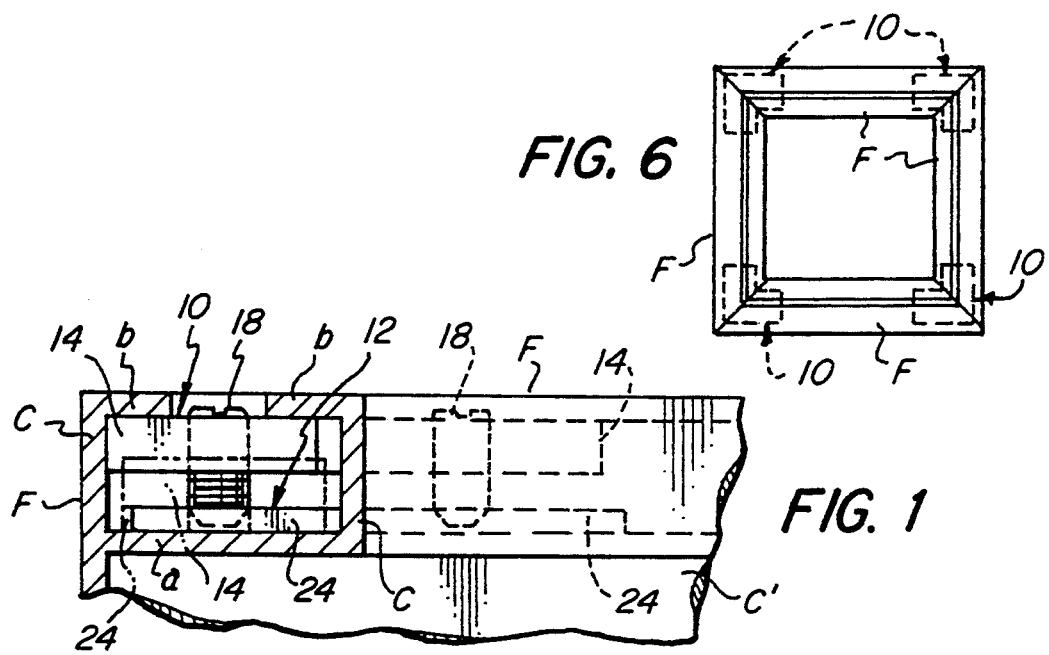
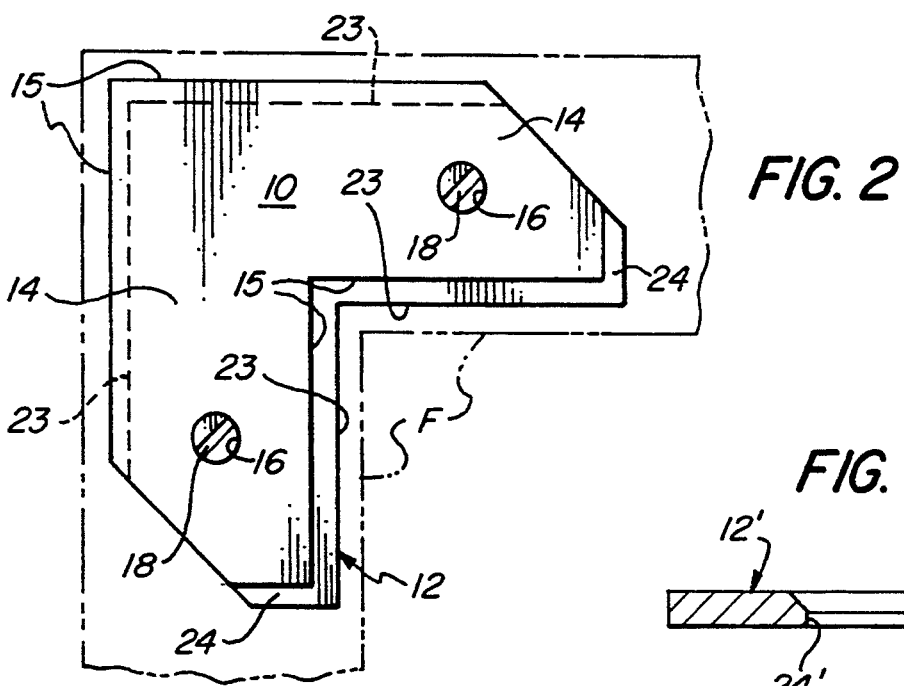
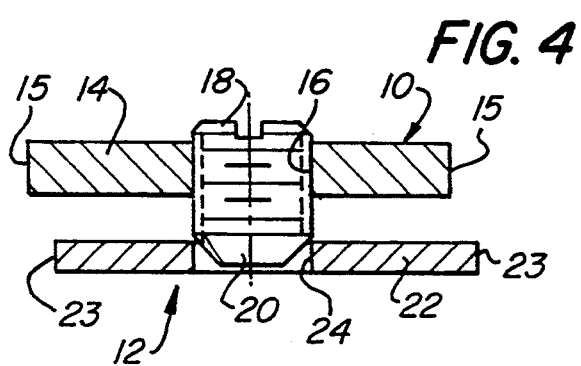
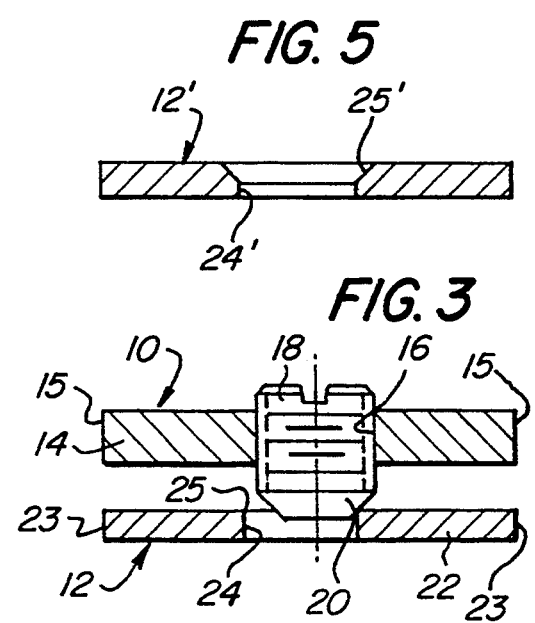

CORNER CLAMP ASSEMBLY

BACKGROUND OF THE INVENTION

This invention relates to frames for pictures and the like and, more particularly, to clamp assemblies used in constructing such frames.

It is conventional to construct picture frames by use of so-called "corners" or "corner clamps." The frame pieces employed are usually formed with channels (e.g., as a metal extrusion); end portions of the corner clamps are inserted into the channels of the frame pieces that are to be joined, after which the clamps are tightened to secure the assembly.

Two-piece clamp sets are described in U.S. Pat. Nos. 3,534,490 to Herbert, 3,965,601 and 4,122,617 to Nielson, and 4,516,341 to Jenkins. The use of a single angle piece at each corner of a frame is disclosed in U.S. Pat. Nos. 4,356,650 to Antonczyk, 4,403,434 to Jenkins, and 4,718,184 to Sherman, and a laterally acting connecting member is shown in UK patent No. 1,571,595, to Ciancimino.

Eisenloeffel U.S. Pat. No. 4,694,598 and Grove Canadian patent No. 1,178,439 provide clamping devices of box-like construction. In each case a screw passes through a rearward wall of the structure and into engagement with a pair of confronting, resilient arms; the ends of the arms are so formed as to cause them to be simultaneously urged forwardly and sidewardly by the screw, thereby to exert both transverse and lateral clamping forces. Canadian patent No. 1,168,445, to Zossimas, is generally similar in the embodiment shown in FIGS. 1 through 3, except that the arms on the clamp appear to produce only lateral force.

Despite the activity in the art exemplified by the foregoing, a need remains for a corner clamp assembly that is suitable for use in the assembly of frame pieces, which is incomplex and relatively facile and inexpensive to manufacture, is convenient to use with minimal need for adjustment or realignment after initial set-up, and is highly effective in producing simultaneously clamping forces in transverse and lateral directions.

SUMMARY OF THE INVENTION

Accordingly, it is a primary object of the present invention to provide a clamp assembly for constructing a frame or the like from a plurality of pieces, which assembly is incomplex and relatively facile and inexpensive to manufacture, is easy and convenient to use, and is highly effective in producing both lateral and transverse clamping forces to securely assemble the frame pieces.

Related objects are to provide a strong and rigid frame that is constructed from separate pieces joined in true relationships to one anther, and to provide a facile method for the assembly of such a frame, which method entails little if any need for adjustment or realignment of the joined pieces.

It has now been found that certain of the foregoing and related objects of the invention are attained by the provision of a clamping assembly comprised of a first plate, a separate second plate, and at least one jacking screw. Each plate has at least two opposite lateral edges extending therealong, which are disposed for substantial registry when the plates are superposed. The "first" plate has at least one recess formation therein, located on an axis that extends substantially normal to a plane in which its lateral edges lie, and disposed therebetween.

Similarly, the "second" plate has at least one threaded aperture in which the jacking screw is engaged, which aperture is located on an axis between its edges and extending substantially normal to a plane in which they lie. Either a tip formation on the screw or the recess formation in the "first" plate, or both, is defined by a bevelled camming surface. The spatial relationships of the recess formation and the threaded aperture to the edges of the respective plates causes the axes therethrough to be mutually offset when the edges of the superposed plates are in registry. Those relationships also cause an element of the coacting formation to be disposed to engage the camming surface, so that advancement of the screw thereagainst will effect both transverse separation and also lateral relative shifting of the plates.

In most instances the lateral edges on the plates will be rectilinear and mutually parallel. The tip formation on the jacking screw may be substantially conical, to provide the camming surface, with the recess formation in the "first" plate being either of uniform cross section or of conical form; in the latter case both conical surfaces will desirably have the same angle and direction of taper (i.e., away from the "second" plate).

Each plate will generally consist of two leg portions; both such portions of the "first" plate will have lateral edges and a recess formation therein, and both such portions of the "second" plate will have lateral edges and an aperture therethrough, all as described. Similarly, the axes associated with one superposed pair of leg portions will be offset by substantially the same distance as the axes associated with the other pair, taken with respect to adjacent edges on the leg portions of either plate. In most instances the leg portions of the plates will be disposed in a mutual relationship other than rectilinear, e.g., mutually perpendicular to produce a rectangular frame.

Other objects of the invention are attained by the provision of a frame comprised of a plurality of separate frame pieces, and a corresponding plurality of clamp assemblies joining adjacent end portions of the frame pieces to one another. Each clamp assembly spans the adjacent end portions of two frame pieces, with the pairs of leg portions clampingly engaged within channels thereof. The jacking screws extend from the "first" plate into engagement with the recess formation of the associated "second" plate, thus separating the plates and urging their outer faces against front and back wall components of the frame pieces; the screws also shift the associated plates relative to one another, urging the lateral edges against the confronting wall components.

Additional objects are attained by the provision of a method for constructing a frame or the like, utilizing the frame pieces and clamp assemblies described. In carrying out the method, the pairs of leg portions of each clamp assembly are inserted into the channels of the frame piece end portions, after which the jacking screws are extended to separate and shift the plates, simultaneously producing the desired lateral and transverse clamping effects.

BRIEF DESCRIPTION OF THE DRAWING

FIG. 1 is a fragmentary elevational view, taken in partial section, showing a frame embodying the present invention and showing, in full and phantom line respectively, expanded and collapsed configurations of the clamp assembly employed;

FIG. 2 is a plan view of the clamp assembly used in the frame of FIG. 1, the latter being depicted in phantom line;

FIG. 3 is a sectional view showing one superposed pair of leg portions of the clamp assembly of the foregoing figures, prior to effective advancement of the jacking screw;

FIG. 4 is a view similar to FIG. 3 with the jacking screw effectively advanced for clamping;

FIG. 5 is a sectional view of a plate suitable for use in the present clamp assembly, having an alternative form of recess formation; and FIG. 6 is a rear elevational, diagrammatic representation of a frame embodying the present invention.

DETAILED DESCRIPTION OF THE ILLUSTRATED EMBODIMENTS

Turning now in detail to FIGS. 1 through 4 and 6 of the drawing, therein illustrated are a frame and a clamp assembly embodying the present invention. The part of the frame that is depicted in FIG. 1 consists of two channel members or pieces "F", the ends of which are mitered at 45° to produce one corner of the common rectangular frame depicted in FIG. 6. Each frame piece consists of front, back and lateral wall components "a", "b", and "c", respectively, and it will be appreciated that the frame has been simplified for clarity of illustration; i.e., features for holding the picture, a backing panel, glass, etc., have been omitted (as suggested by the broken-away extension c' from outer wall component c) as being non-essential to a full description and understanding of the invention.

The clamp assembly comprises an upper or rearward plate, generally designated by the numeral 10, and a lower or forward plate generally designated by the numeral 12. The upper plate consists of two, mutually perpendicular leg portions 14, each of which has parallel, rectilinear lateral edges 15 and a threaded aperture 16 therebetween. A set screw 18, having a frustoconical tip formation 20 thereon, is engaged in each of the apertures 16. The lower plate 12 similarly has mutually perpendicular leg portions 22 thereon, with circular holes 24 formed between its parallel, rectilinear edges 23.

As best seen in FIG. 3, prior to insertion into the frame members F the plates 10 and 12 are disposed in superposed relationship, with the respective edges 15 and 23 thereof in registry with one another. It will be noted that the axis of the screw 18 is offset from that of the hole 24 in that relationship, causing the shoulder element 25 at the entrance to the hole to register between the margins of the conical tip formation 20. Consequently, advancement of the screw 18 toward and beyond engagement of the plate 12 will not only effect its separation from the plate 10 but will also effect a mutual shifting of the plates 10, 12, ultimately to produce the relationship shown in FIGS. 1 (in full line), 2 and 4. This will of course generate clamping forces in both the transverse direction (i.e., against wall components a and b of the frame pieces F) and also the lateral direction (i.e., against opposing sidewall components c).

FIG. 5 shows an alternative form of a lower plate 12' that may be desirably utilized in the assembly. As can be seen, it differs from plate 12 only in that a countersink leads to the aperture 24', providing a frustoconical shoulder 25' at the entrance. The resultant surface may coact somewhat more smoothly with the conical surface on the tip of the screw 18, and may therefore be deemed preferable in certain respects.

Although right-angle plates are depicted in the drawing, it will be appreciated that clamps for constructing frames with shapes other than rectangular may be provided and would of course have their leg portions disposed at an appropriate angle other than 90°; indeed, a straight clamp may be provided for joining pieces to extend on a common rectilinear axis. Other modifications can be made in the instant clamp assemblies and components without departure from the novel concepts of the present invention, as will be evident to those skilled in the art.

Thus, it can be seen that the present invention provides a clamp assembly for constructing a frame or the like from a plurality of pieces, which assembly is incomplex and relatively facile and inexpensive to manufacture, is easy and convenient to use, and is highly effective for producing both lateral and transverse clamping forces to securely assemble a multiplicity of frame pieces. The invention also provides a strong and rigid frame that is constructed from separate pieces joined in true relationships to one another, as well as providing a facile assembly method in which there is little if any need for adjustment or realignment of the joined pieces.

Having thus described the invention, what is claimed is:

1. A clamp assembly for joining adjacent parts, each part having lateral and transverse wall elements defining an interior space, comprising:

a first plate having at least two opposite lateral edges extending therealong in a common plane, said plate having at least one recess formation therein with an entrance located on an axis lying between said edges and extending substantially normal to said plane;

a separate second plate having at least two opposite lateral edges extending therealong in a common plane and disposed for substantial registry with said edges of said first plate when said second plate is superposed therewith, said second plate having at least one threaded aperture located on an axis lying between said edges of said second plate and extending substantially normal to said plane of said second plate; and at least one jacking screw threadably engaged in said aperture of said second plate, said screw having a tip formation at one end and means for turning at the other end, at least one of said tip and recess formations being defined by a bevelled camming surface; said recess formation and said aperture being disposed such in spatial relationships to said edges of said respective plates as to cause said axes to be mutually offset when said plates are in superposed relationship with said edges of said plate in such registry, and said spatial relationships also causing a surface element of said other formation to be so disposed as to engage said camming surface of said one formation in said superposed plate relationship, advancement of said screw against said camming surface effecting transverse separation as well as shifting of said plates relative to one another in said common planes to offset said edges of said first plate relative to said edges of said second plate whereby, when said assembly is contained within the interior spaces of adjacent parts having lateral and transverse wall elements defining those spaces, advancement of said screw will cause said plates to exert clamping forces upon both the transverse and also the lateral wall elements of the parts, to join them to one another.

2. The assembly of claim 1 wherein said lateral edges on said plates are all rectilinear.

3. The assembly of claim 2 wherein said lateral edges on said plates aye mutually parallel.

4. The assembly of claim 1 wherein said tip formation is substantially conical and provides said camming surface, said camming surface tapering in a direction away from said second plate, and wherein said recess formation is of uniform circular cross section, said surface element of said other formation being provided by a shoulder of said first plate surrounding said entrance to said recess formation.

5. The assembly of claim 1 wherein said tip formation is substantially conical and provides said camming surface, and wherein a conical surface also characterizes said recess formation, both of said camming and conical surfaces having the same angle of taper and tapering in a direction away from said second plate, said surface element of said other formation comprising substantially a contact line on said recess formation surface.

6. The assembly of claim 1 wherein said recess formation is provided by an aperture in said first plate.

7. The assembly of claim 1 wherein each of said plates consists of two leg portions, each of said leg portions of said first plate having said lateral edges thereon and said recess formation therein, and each of said leg portions of said second plate having said lateral edges thereon and said aperture therethrough, said axes associated with one superposed pair of said leg portions being offset by substantially the same distance as said axes associated with the other superposed pair of said leg portions, said offsets being taken with respect to adjacent edges on said leg portions of either of said plates.

8. The assembly of claim 7 wherein said leg portions of each of said plates are disposed in a mutual relationship other than rectilinear.

9. The assembly of claim 8 wherein said leg portions of each of said plates are mutually perpendicular.

10. A frame comprised of a plurality of separate frame pieces with adjacent end portions joined to one another, said end portions having front, back, and lateral wall components defining channels therein; and a corresponding plurality of said clamp assembly of claim 7 joining said frame pieces in such relationship, each said clamp assembly spanning the adjacent end portions of two frame pieces with said superposed pairs of leg portions clampingly engaged within said channels thereof, said jacking screws extending from said first plates into engagement with said recess formations of the associated leg portions of said second plates in registry therewith, separating said associated plates and urging outwardly disposed faces thereof against said front and back wall components of said frame pieces, said jacking screws also shifting said associated plates relative to one another and urging said lateral edges thereof against said lateral wall components of said end portions.

11. In a method for joining adjacent parts, the steps comprising:
providing a plurality of parts having opposite end portions with channels therein defined by front, back, and lateral wall components;
providing a plurality of said clamp assembly of claim 7;
inserting said pairs of leg portions of each said clamp assembly into said channels with said assembly spanning adjacent end portions of two parts and
extending said jacking screws from said first plate of each said assembly to engage said recesses of said second plate in registry therewith, and to separate said plates so as to urge outwardly disposed faces thereof against said front and back wall components of said parts, extension of said screws simultaneously shifting said plates relative to one another so as to urge said lateral edges thereof against said lateral wall components of said parts.

* * * * *